United States Patent
Gallagher

(10) Patent No.: US 7,327,390 B2
(45) Date of Patent: Feb. 5, 2008

(54) METHOD FOR DETERMINING IMAGE CORRECTION PARAMETERS

(75) Inventor: Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 1000 days.

(21) Appl. No.: 10/357,597

(22) Filed: Feb. 4, 2003

(65) Prior Publication Data

US 2004/0150726 A1 Aug. 5, 2004

(51) Int. Cl.
*H04N 5/76* (2006.01)
(52) U.S. Cl. .................... 348/224.1; 348/231.6
(58) Field of Classification Search ......... 348/224.1, 348/231.6
See application file for complete search history.

(56) References Cited

U.S. PATENT DOCUMENTS

| | | | | |
|---|---|---|---|---|
| 5,461,440 | A | 10/1995 | Toyoda et al. | 354/106 |
| 5,671,297 | A | 9/1997 | Koppe et al. | 382/293 |
| 6,115,104 | A * | 9/2000 | Nakatsuka | 355/40 |
| 6,219,446 | B1 | 4/2001 | Kiriki et al. | 382/167 |
| 6,323,934 | B1 * | 11/2001 | Enomoto | 355/40 |
| 6,657,658 | B2 * | 12/2003 | Takemura | 348/207.99 |
| 6,935,521 | B2 * | 8/2005 | Gundlach et al. | 211/183 |
| 6,937,370 | B1 * | 8/2005 | Nitta et al. | 358/518 |
| 7,065,255 | B2 * | 6/2006 | Chen et al. | 382/260 |
| 7,151,564 | B2 * | 12/2006 | Kubo | 348/231.6 |
| 2003/0076420 | A1 * | 4/2003 | Akiyama et al. | 348/207.1 |
| 2004/0135889 | A1 * | 7/2004 | Koizumi et al. | 348/207.1 |

OTHER PUBLICATIONS

U.S. Appl. No. 09/957,013, filed Sep. 20, 2001, Richard B. Wheeler et al.
U.S. Appl. No. 09/626,882, filed Jul. 27, 2000, Andrew C. Gallagher.
"Automatic calibration and removal of distortion from scenes of structured environments" by Frederic Devernay and Olivier Faugeras. SPIE vol. 2567, Jul. 1995, pp. 62-72.
"Close Range Camera Calibration" by D. Brown, *Photogrammetric Engineering*, 1971, pp. 855-866.

* cited by examiner

*Primary Examiner*—John M. Villecco
*Assistant Examiner*—Dillon Durnford-Geszvain
(74) *Attorney, Agent, or Firm*—David M. Woods

(57) ABSTRACT

In order to reduce image degradation due to image capture problems, a method utilizes image data corresponding to a captured image and image capture metadata that refers specifically to information that is associated with capture of the image. A database of correction parameters is provided in order to reduce degradation present in the captured image, whereby each correction parameter is associated with particular image capture metadata. The method involves using the image capture metadata to determine whether the database contains one or more correction parameters associated with that image capture metadata, and then producing correction parameters from the database of correction parameters when the database contains correction parameters associated with the image capture metadata. One or more new correction parameters are produced when the database does not contain correction parameters associated with the image capture metadata. The database then may be updated with the new correction parameters.

20 Claims, 6 Drawing Sheets

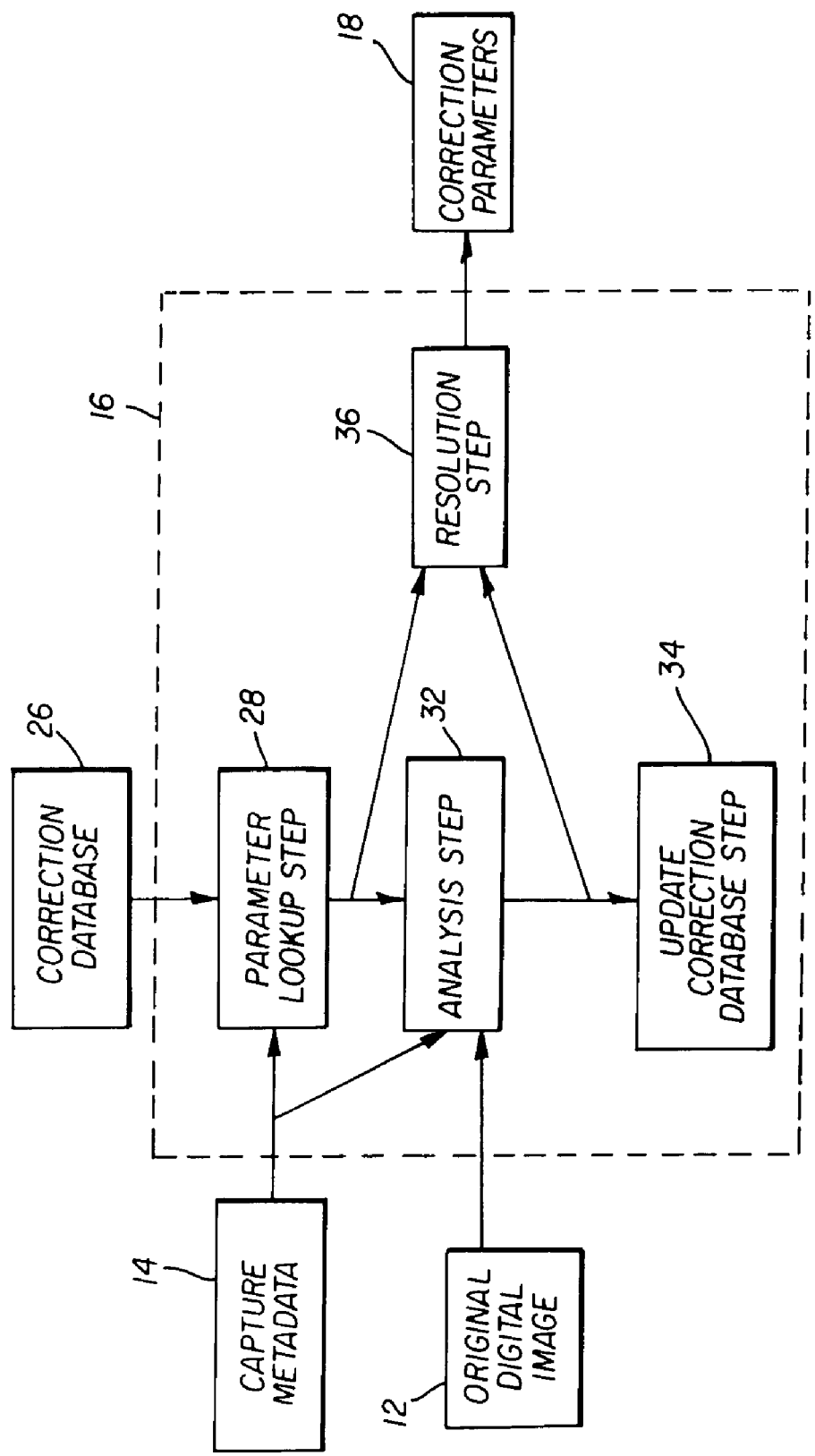

METHOD FOR DETERMINING IMAGE CORRECTION PARAMETERS

CROSS REFERENCE TO RELATED APPLICATION

Reference is made to commonly assigned copending application Ser. No. 09/957,013, entitled "System and Method for Detecting When to Correct Image-Specific Defects Based on Camera, Scene, Display and Demographic Data" and filed 20 Sep. 2001 in the names of Richard B. Wheeler and Brian W. Keelan, which is assigned to the assignee of this application.

FIELD OF INVENTION

The present invention relates to digital image processing, and in particular to digital image processing methods for correcting and reducing image degradation due to deterministic problems related to image capture.

BACKGROUND OF THE INVENTION

Many digital image processing algorithms are designed to improve the quality of an image by correcting for a deterministic problem in the image path. For example, lenses often produce optical distortion that degrades the quality of the captured image. It is often more economically feasible to correct the degradation with digital image processing rather than through complicated lens design steps. If the degradation is known precisely, then a correction can be made to the image by digitizing the image and applying a correction algorithm using correction parameters. Typically, a given set of correction parameters for a given degradation relate only to a specific lens at a particular setting. For example, a single zoom lens may produce a different level of distortion for each different level of zoom.

This implies that several possible solutions could be used to correct for the degradations in an image. First consider an imaging system that for each image, associated metadata (non-image information that is associated with an image) is used to determine the correction parameters. For example, if the camera type and focal length were provided as metadata associated with an image, then a database could be used to determine the appropriate correction parameters for the image. The database would contain metadata and correction parameters in pairs. For a practical image processing system, an extensive database of many different camera types would be required to effectively implement a system having the ability to correct for deterministic problems of the image path. Such a database would be difficult to maintain, as new cameras (especially digital cameras) are commonly being introduced to the marketplace. Characterizing the cameras and updating the database is labor-intensive and, as a result, expensive. An additional disadvantage of this method is that if the system encounters an image with metadata not in the database, then that image's quality cannot be improved.

For example, in U.S. Pat. No. 5,461,440, Toyoda et al. describe a method of writing on film an identification code indicating an amount of degradation produced by the optical system. This identification code is used to determine image quality degradation information that is used to correct for the image quality. This method has the short-comings mentioned above. In U.S. Pat. No. 6,219,446, Kiriki et al. describe a method of extracting correction parameters for an image capture problem (e.g lens distortion) by using exposures of structured target images and analyzing the images of the targets. Unfortunately, not all images contain targets, and it is desirable to be able to correct for the capture problems of images without associated targets.

Alternatively, consider an image processing system that can determine, via an automatic algorithm, the correction parameters that will produce the best correction for a given image degradation. For example, for the image degradation of lens distortion, the plumb-line method (D. Brown, "Close Range Camera Calibration", *Photogrammetric Engineering*, pp. 855-866, 1971) is an automatic method used to determine appropriate correction parameters for an image or a set of images captured with similar optical conditions (i.e., where the camera manufacturer, focal length, etc. are similar). However, this algorithm and many automatic algorithms are computationally intensive. In addition, the algorithm is applied to determine the correction parameters over and over for the same camera with identical optical conditions (despite the fact that the correction parameters should be constant). Therefore, using an automatic algorithm allows the image processing system to potentially improve the image quality of images from unknown sources, but it is not efficient.

Thus there exists a need for an efficient method by which digital image processing can be used to correct for deterministic capture problems.

SUMMARY OF THE INVENTION

The present invention is directed to overcoming one or more of the problems set forth above. Briefly summarized, according to one aspect of the present invention, the invention resides in a method for processing an image to reduce image degradation due to image capture problems, comprising the steps of: (a) providing image data corresponding to a captured image and image capture metadata that refers specifically to information that is associated with capture of the image; (b) providing a database of correction parameters that can be used to reduce degradation present in the captured image, whereby each correction parameter is associated with particular image capture metadata; (c) using the image capture metadata to determine whether the database contains one or more correction parameters associated with the image capture metadata; (d) producing correction parameters from the database of correction parameters when the database contains correction parameters associated with the image capture metadata; and (e) producing one or more new correction parameters from an algorithm when the database does not contain correction parameters associated with the image capture metadata. The database then may be updated with the new correction parameters produced by step (e).

According to another aspect of the invention, the correction parameters from the database are used to produce a functional fit between the correction parameters in the database and the particular image capture metadata associated with the correction parameters, and then the functional fit is used to provide one or more new correction parameters when the database does not contain correction parameters associated with the image capture metadata.

According to yet another aspect of the invention, each correction parameter in the database of correction parameters is associated with particular image capture metadata and with a confidence value. Then, one or more correction parameters are produced from the database of correction parameters when the database contains one or more correction parameters associated with the image capture metadata and the confidence value meets a criteria. Alternatively, one or more improved correction parameters are produced when the database does not contain correction parameters associated with the image capture metadata or if the confidence value does not meet the criteria.

The advantage of the invention is that it provides an efficient method by which digital image processing can be used to correct for deterministic capture problems.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 6 is a block diagram of an alternative embodiment of the parameter determiner shown in FIG. 2.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
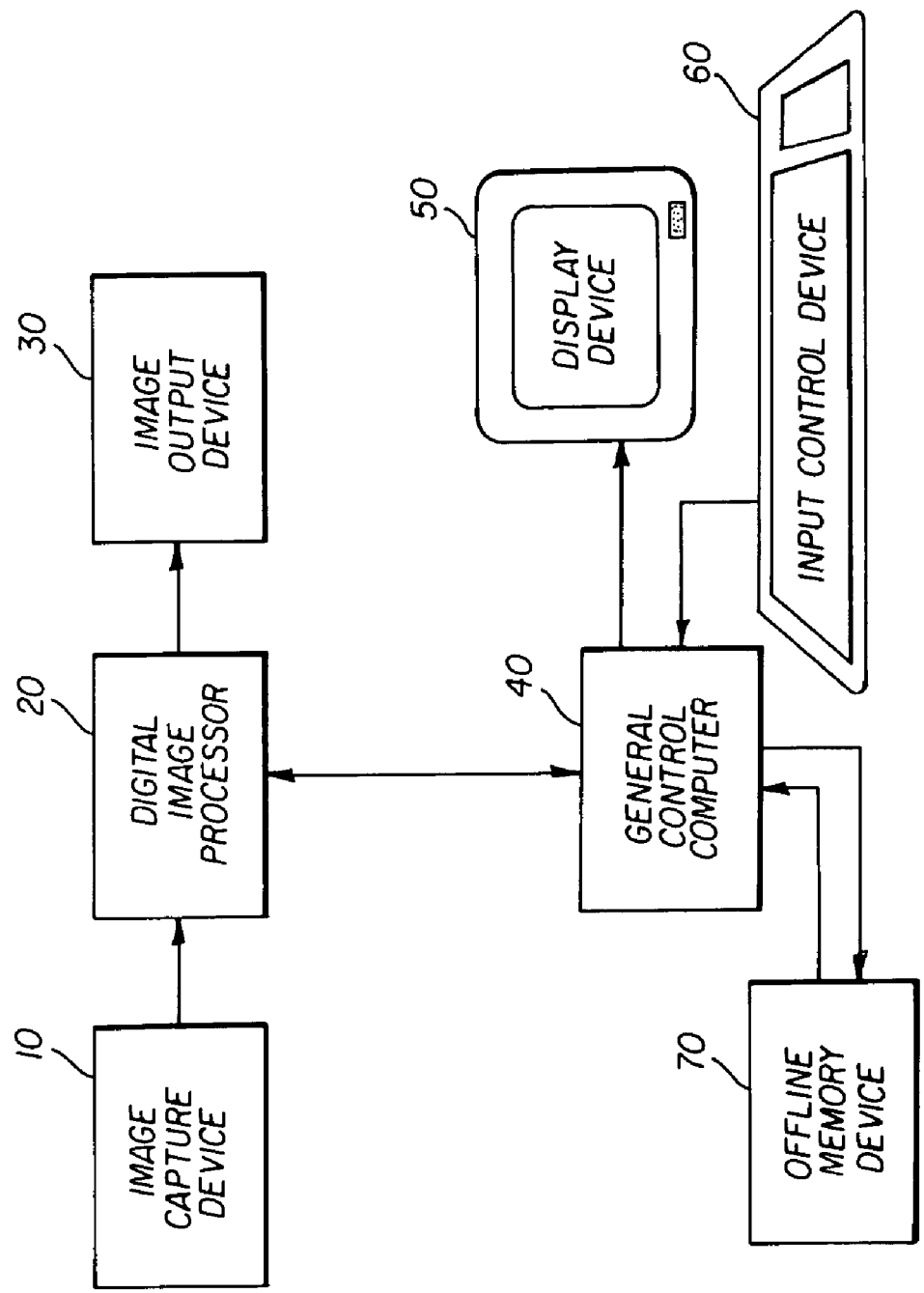
FIG. 1 is a functional block diagram of a computer system suitable for practicing the present invention.

The present invention may be implemented in computer hardware. Referring to FIG. 1, the following description relates to a digital imaging system which includes an image capture device 10, an digital image processor 20, an image output device 30, and a general control computer 40. The system can include a display device 50 such as a computer console or paper printer. The system can also include an input control device 60 for an operator such as a keyboard and or mouse pointer. The present invention can be used with multiple capture devices 10 that produce digital images. For example, FIG. 1 can represent a digital photofinishing system where the image capture device 10 is a conventional photographic film camera for capturing a scene on color negative or reversal film, and a film scanner device for scanning the developed image on the film and producing a digital image. The digital image processor 20 provides the means for processing the digital images to produce pleasing looking images on the intended output device or media. The present invention can be used with a variety of output devices 30 that can include, but not be limited to, a digital photographic printer and soft copy display. The digital image processor 20 can be used to process digital images to make adjustments for overall brightness, tone scale, image structure, etc. of digital images in a manner such that a pleasing looking image is produced by an image output device 30. Those skilled in the art will recognize that the present invention is not limited to just these mentioned image processing functions.

The general control computer 40 shown in FIG. 1 can store the present invention as a computer program stored in a computer readable storage medium, which may comprise, for example: magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device 70. Before describing the present invention, it facilitates understanding to note that the present invention is preferably utilized on any well-known computer system, such as a personal computer. In addition, FIG. 1 may represent components of a digital camera or a digital photofinishing system.

It should also be noted that the present invention implemented in a combination of software and/or hardware is not limited to devices which are physically connected and/or located within the same physical location. One or more of the devices illustrated in FIG. 1 may be located remotely and may be connected via a wireless connection.

A digital image $i(x,y)$ is comprised of one or more digital image channels. Each digital image channel is typically comprised of a two-dimensional array of pixels. The digital image $i(x,y)$ contains X rows of pixels and Y columns of pixels. Each pixel value relates to the amount of light received by the imaging capture device corresponding to the physical region of a pixel. For color imaging applications, a digital image will often comprise red, green, and blue digital image channels. For monochrome applications, the digital image will only contain one digital image channel. Motion imaging applications can be thought of as a sequence of digital images. Those skilled in the art will recognize that the present invention can be applied to, but not be limited to, a digital image channel for any of the above mentioned applications. Although a digital image channel is described as a two dimensional array of pixel values arranged by rows and columns, those skilled in the art will recognize that the present invention can be applied to mosaic (non rectilinear) arrays with equal effect. Those skilled in the art will also recognize that describing a digital image processing step hereinbelow as "replacing original pixel values with processed pixel values" is functionally equivalent to describing the same processing step as "generating a new digital image with the processed pixel values while retaining the original pixel values".

The preferred embodiment of the present invention is described with reference to FIG. 2, where image data from a digital image 12 has image capture metadata 14 that refers specifically to information that is associated with capture of the image. The source of the digital image 12 may be from a digital camera, a scan of a photographic film, or a scan of a print, as well as any of a number of different sources as known by those skilled in the art of image processing.

Metadata refers to non-image data that is associated with an image. Metadata may refer to information such as camera manufacturer, camera model number, information indicating whether the camera flash was fired, the lens focal length, the time of day the image was captured, the geographic location of the image, the desired size of a print of the image, and any number of other descriptors. Capture metadata 14 is a subset of metadata that refers specifically to information associated with the capture of the image. For example, the camera manufacturer, lens focal length, aperture value, flag indicating whether the flash was fired, and lens focus position are all examples of capture metadata 14. Capture metadata 14 is any metadata that might vary depending on the camera or camera settings used to capture a specific image. Thus, focal length is capture metadata 14 but geographic location of the image is not. Capture metadata 14 is often recorded at the time the image is captured by the camera. It is common to record metadata directly on the film used with a film camera. For example, many cameras are available that can record metadata to a magnetic layer on the film itself (e.g., Advanced Photo System (APS) cameras can record metadata to a magnetic layer in APS film). With digital cameras, it is common for the camera to record metadata in the digital image file itself. For example, metadata is often recorded in the EXIF file header of a JPEG image. Capture metadata 14 could also be associated with the image manually by a human. For example, a photographer can record with a notepad and pencil the focal length and shutter speed that was used to expose a 35 mm negative. Later, when the processed 35 mm negative has been developed and scanned to form a digital image, the photographer could associate the recorded capture metadata 14 with the digital image 12 using a computer.

The capture metadata 14 is input to a parameter determiner 16. The purpose of the parameter determiner 16 is to find correction parameters 18 that can be used by an image processing algorithm 22 to remove or reduce degradation present in the digital image. The correction parameters 18 output from the parameter determiner 16 are input to the image processing algorithm 22 along with image data from the digital image 12. The digital image 12 is then processed by the image processing algorithm 22 according to the correction parameters 18 to reduce or remove the degradation from the digital image 12, producing an enhanced digital image 24. The parameter determiner 16, correction parameters 18, and image processing algorithm 22 will be described in greater detail hereinbelow.

The parameter determiner 16 finds correction parameters 18 that can be used by an image processing algorithm 22 to correct for an image capture degradation, such as lens falloff (sometimes called marginal attenuation), lens distortion, and lateral color aberration, or defocus. An image capture degradation is a result of a non-ideal image capture system and reduces the quality of the resulting image. The correction parameters 18 are values that relate to the specific magnitude or character of a given image capture degradation, instructing the image processing algorithm 22 to achieve an appropriate correction in the enhanced digital image 24. Preferably, the correction parameters 18 are values that are input to the image processing algorithm 22. Alternatively, the correction parameters 18 can directly describe the image capture degradation. For example, the correction parameters 18 could be a percent distortion when the image processing algorithm 22 corrects lens distortion. When the image processing algorithm 22 corrects for defocus, the correction parameters 18 could be the coefficients of a digital filter.

Figure 2:
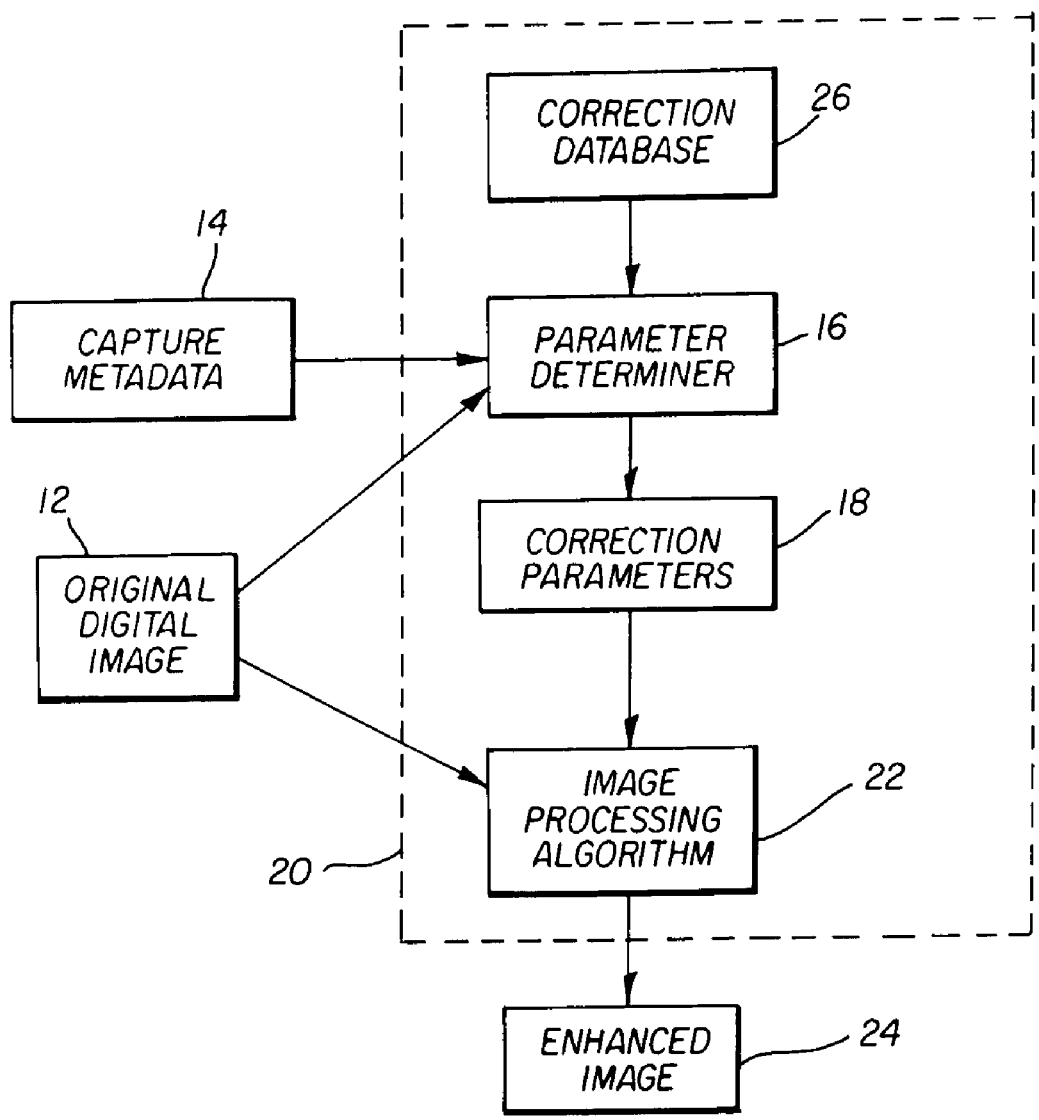
FIG. 2 is a block diagram of the present invention.
Figure 3:
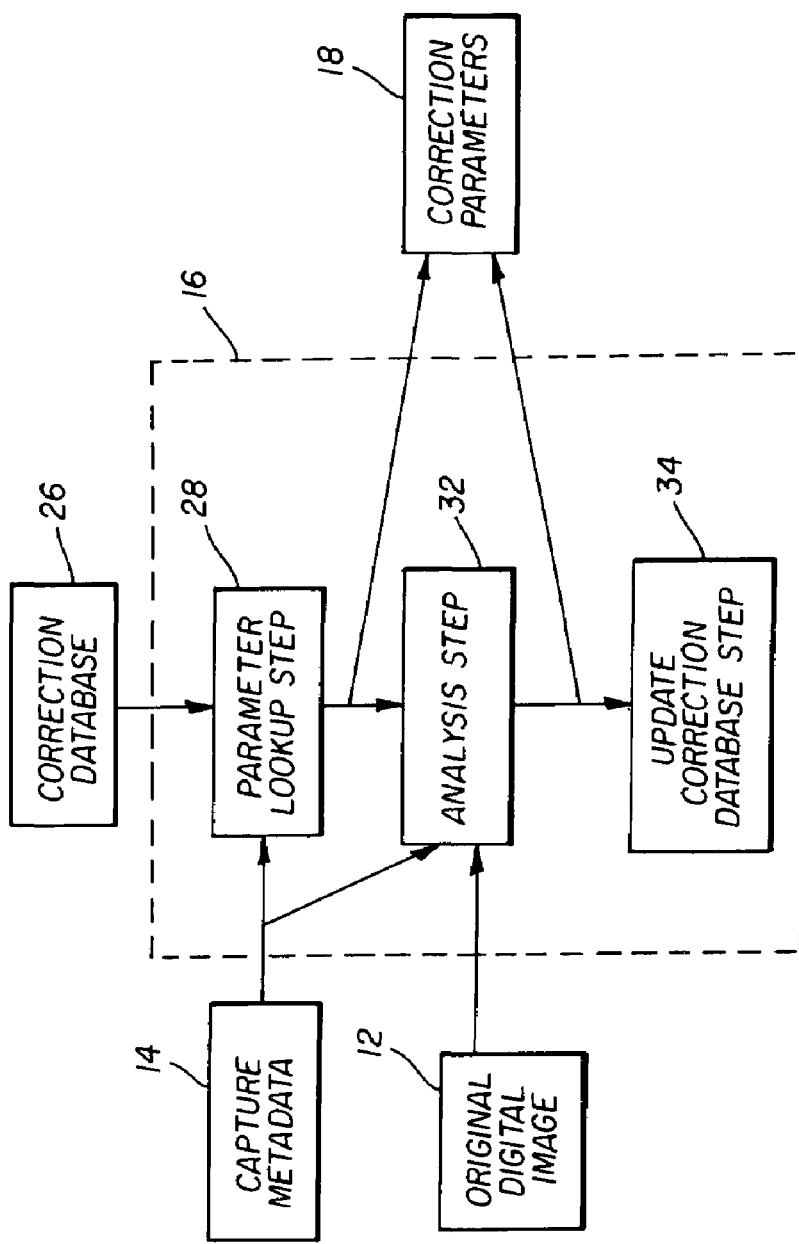
FIG. 3 is a block diagram of the parameter determiner shown in FIG. 2.

FIG. 3 shows the parameter determiner 16 in more detail. The parameter determiner 16 inputs a correction database 26, containing capture metadata 14 and associated correction parameters 18 in pairs. The association of the capture metadata 14 and the correction parameters 18 could take the form of a look-up-table, an equation (functional relationship) or a set of equations, as will be described in detail hereinbelow. In a parameter lookup step 28, the correction database 26 is searched (via computer with a search algorithm commonly known in the art) for capture metadata 14 matching the capture metadata 14 associated with the digital image. In the event that the capture metadata 14 match is found in the correction database 26, the parameter lookup step 28 outputs the associated correction parameters 18. If the capture metadata 14 is not located in the correction database 26, then the correction parameters 18 are determined with an analysis step 32, which will be described in greater detail below. The analysis step 32 determines the correction parameters 18, which are input to the image processing algorithm 22 of FIG. 2; in addition, an update correction database step 34 is used to update the correction database 26 with the capture metadata 14 and the associated correction parameters 18. The next time a digital image 12 is processed with the same capture metadata 14, the correction parameters 18 can be found with the speedier and more efficient parameter lookup step 28 (rather than repeating the analysis step 32).

When searching the correction database 26 for capture metadata matching that of the digital image 12, the metadata must match only for those items of capture metadata specified within the correction database 26 associated with the particular set of correction parameters 18. For example, the correction database may include the following:

Database Table
Fuji FinePix 1400 Zoom Digital Camera

| Focal Length (mm): | Correction Parameter $a_x = a_y$ |
|---|---|
| 60/10 | −0.06 |
| 67/10 | −0.03 |
| 80/10 | 0 |
| 96/10 | 0.012 |
| 180/10 | 0.042 |

In the correction database, negative correction parameter values correct for barrel distortion and positive correction parameter values correct for pincushion distortion. A correction parameter of 0 indicates that there is a negligible amount of distortion.

If, referring for example to the values in the Database Table, a digital image 12 has associated capture metadata, as follows: Fuji FinePix 1400 Zoom Digital Camera, Focal Length 80/10, F Number 36/10, then the parameter determiner 16 matches the image's associated capture metadata within the correction database 26, and outputs a correction parameter $a_x=a_y=0$. The fact that the image's associated capture metadata 14 had an item (F Number) that was not specified in the correction database does not preclude a capture metadata match; rather, it indicates that the correction parameters 18 are independent of the omitted capture metadata item. Preferably, the parameter lookup step 28 requires an exact match between the image's capture metadata and the capture metadata in the correction database to output the associated correction parameters 18. Alternatively, the lookup step 28 can also output correction parameters 18 when there is a near-match between capture metadata 14 in the correction database 26 and capture metadata associated with the image 12. For example, a near match can occur when every item of the image's capture metadata is within 10% of that of a set of correction parameters in the correction database 26.

The data represented in the correction database 26 may be in any form. Preferably the data in the correction database 26 is stored as ASCII text. Commercial database packages are widely available. The tasks of performing a search of a database and modifying or adding data to a database are common, and are preferably performed with the ANSI standard SQL (Structured Query Language).

The analysis step 32 is used to determine the correction parameters 18 when the correction parameters 18 are not located by the lookup step 28. The analysis step 32 can be a human operator who manually determines the correction parameters 18 using a graphical user interface to view enhanced digital images 24 produced by different proposed correction parameters. The human operator determines the correction parameters 18 by selecting the proposed correction parameters producing the most pleasing enhanced digital image. The correction parameters 18 are then written to the correction database 26 along with the capture metadata 14 in an update correction database step 34.

Preferably, the analysis step 32 applies an automatic algorithm in order to determine the optimal correction parameters 18. For example, in the case where the capture degradation is lens distortion, several authors have described methods of determining the distortion parameters from natural scenes that are automatic or semi-automatic. As previously described, such parametric description of an image capture degradation is equivalent to the correction parameters of the present invention, because either can be used by an image processing algorithm to correct the degradation. In U.S. Pat. No. 6,101,288, Kang described a method of determining correction parameters by requiring a user to manually select arbitrary lines in the image. Devernay and Faugeras describe a fully automatic method of determining the distortion parameters from a digital image of a structured environment in their article, "Automatic Calibration and Removal of Distortion from Scenes of Structured Environments", *SPIE Conference Proceedings*, Jul. 1995, pp. 62-72. In their method, image edges are detected and linked to form line segments. These line segments correspond to lines in the original scene that because of lens distortion may be slightly curved in the digital image. The distortion error relates to an overall measure of curvature of the detected line segments. The distortion error is zero if the detected line segment is exactly straight, and increases with line segment curvature. The distortion parameters are determined by finding those parameters that minimize the distortion error. In other words, the optimal correction parameters for distortion correction are those parameters that when the digital image is processed with the image processing algorithm, the resulting enhanced digital image line segments have the minimum distortion error (the detected line segments are maximally straight.) Their algorithm is based on earlier work by Brown, described in "Close Range Camera Calibration", *Photogrammetric Engineering*, pp. 855-866, 1971.

Those skilled in the art will recognize that the parameter determiner 16 of FIG. 2 (and the contained analysis step 32) must be coordinated with the image processing algorithm 22. The action of the image processing algorithm 22 is controlled by the correction parameters 18. The parameter determiner 16 must be coordinated with the image processing algorithm 22 so the correction parameters 18 correct for the capture degradations in the digital image 12.

Those skilled in the art will also recognize that the analysis step 32 of FIG. 3 may simultaneously consider more than one digital image (as long as the appropriate capture metadata 14 is similar, preferably within 10%) in order to improve the determination of the correction parameters 18. In the example above where the parameter determiner 16 finds parameters for the distortion, many digital images from a single camera may be considered with the analysis algorithm described by Deverney et al. to determine the correction parameters 18. The many digital images preferably all have identical focal lengths.

As shown in FIG. 2, an enhanced digital image o(m,n) 24 is output from the image processing algorithm 22. If the image processing algorithm 22 corrects for distortion, the enhanced digital image 24 is created by the image processing algorithm 22 as follows:

Preferably, the enhanced digital image o(m,n) 24 has the same number of rows and columns as the input digital image i(x,y) 12. In other words, M=X and N=Y. Each pixel location in the enhanced digital image o($m_o$, $n_o$) 24 is mapped back to a specific location in the input digital image i($x_o,y_o$) 12. Typically, ($x_o,y_o$) will not correspond to an exact integer location, but will fall between pixels on the input digital image i(x,y) 12. The value of the pixel o($m_o,n_o$) is determined by interpolating the value from the pixel values nearby i($x_o,y_o$). This type of interpolation is well known in the art of image processing and can be accomplished by nearest neighbor interpolation, bilinear interpolation, bicubic interpolation, or any number of other interpolation methods. For example, U.S. Pat. No. 5,671,297 describes one such interpolation method for use with distortion compensation. If the location (x,y) falls outside of the range of the image i(x,y) (i.e., if $x_o$<−X/2 or $x_o$>X/2 or $y_o$<−Y/2 or $y_o$>Y/2), then the value of o($m_o,n_o$) is set equal to a default value such as 0 or 255, or the value of o($m_o,n_o$) is set equal to the value of the nearest pixel of i(x,y).

A distortion model governs the mapping of locations (m,n) of the enhanced digital image 24 to locations (x,y) of the input image 12 by the image processing algorithm 22. In the preferred embodiment the distortion model, which maps a specific location ($m_o,n_o$) of the enhanced digital image 24 to a location ($x_o,y_o$) in the input image 12 is given as:

$$x_o = \left( m_o + \frac{c a_x m_o}{z \cdot z_x} \left[ \left( \frac{m_o}{z \cdot z_x} \right)^2 + \left( \frac{n_o}{z \cdot z_y} \right)^2 \right] \right) d$$

$$y_o = \left( n_o + \frac{c a_y n_o}{z \cdot z_y} \left[ \left( \frac{m_o}{z \cdot z_x} \right)^2 + \left( \frac{n_o}{z \cdot z_y} \right)^2 \right] \right) d$$

where:

c=the channel specific zoom factor used to correct for lateral chromatic aberration. For example, c=0.997, 1.0, 1.004 for the red, green, and blue digital image channels, respectively. Default is 1.0.

$a_x$=the distortion parameter for the long dimension of the image.

$a_y$=the distortion parameter for the short dimension of the image.

For cameras with a radially symmetric optical system, $a_x$=$a_y$. The optimal values of $a_x$ and $a_y$ depend on the capture metadata. For example, referring to Table I, for a Fuji FinePix 1400 Zoom Digital Camera with a focal length of 180/10, optimal $a_x$=$a_y$=0.042.

z=an overall zoom factor designed to ensure that location ($x_o, y_o$) falls within the limits of the image. Default is 1.0.

$z_x$=a zoom factor for the long dimension of the image. Default is 1.0. This zoom factor can be used to correct an incorrect image aspect ratio.

$z_y$=a zoom factor for the short dimension of the image. Default is 1.0. This zoom factor can be used to correct an incorrect image aspect ratio.

d=the normalization quantity.

$$d = \frac{\sqrt{X^2 + Y^2}}{2}$$

The parameters c, $a_x$, $a_y$, z, $z_x$, and $z_y$ are distortion correction parameters 18. The distortion model represents a non-symmetric distortion model any time that $a_x \neq a_y$ (such as represents the distortion of a camera having a cylindrical imaging surface, e.g., as with a single-use camera). The described distortion model is a $3^{rd}$ order polynomial that provides an excellent non-symmetric distortion correction, but higher order terms could also be included.

If $a_x = a_y$, then the distortion model is radially symmetric. Assuming default values for c, z, $z_x$, and $z_y$, the distortion model requires only two parameter values ($a_x$ and $a_y$) to correct for the nonsymmetrical distortion found in cameras with cylindrical image surfaces. If the cylindrical image surface accurately follows the focal surface of the image system, then the distortion along the long dimension of the image may be negligible and $a_x=0$, requiring specification only of $a_y$.

After the analysis step 32, the database 26 is updated with an update correction database step 34. There are preferably two aspects of the update correction database step 34.

In the first aspect, the database 26 is updated by adding to it the determined correction parameters 18 with the associated capture metadata 14. For example, suppose the correction database 26 includes the values found in the Database Table, as follows:

| Database Table Fuji FinePix 1400 Zoom Digital Camera | |
|---|---|
| Focal Length (mm): | Correction Parameter $a_x = a_y$ |
| 60/10 | −0.06 |
| 67/10 | −0.03 |
| 80/10 | 0 |
| 96/10 | 0.012 |
| 180/10 | 0.042 |

Although in this example as shown in the Database Table, only one correction parameter (i.e., $a_x=a_y$) is associated with each entry of capture metadata 14 (i.e., camera type and focal length), it will often be useful to use more than one correction parameter associated with each entry of capture metadata 14.

Suppose further that a digital image 12 and associated capture metadata 14 is input to the present embodiment of the invention for correction of capture degradation. For example, let the associated capture metadata 14 be: Camera: Fuji FinePix 1400 Zoom Digital Camera. Focal Length: 124/10. The parameter determiner 16 first searches the correction database 26 for a match with the capture metadata 14, but no match for the camera and focal length combination is found. Using the automatic analysis step 32, the correction parameters 18 are found to be $a_x=a_y=0.023$. After the step of updating the correction database 34, the database 26 then includes the information, as follows:

| Database Table (updated) Fuji FinePix 1400 Zoom Digital Camera | |
|---|---|
| Focal Length (mm): | Correction Parameter $a_x = a_y$ |
| 60/10 | −0.06 |
| 67/10 | −0.03 |
| 80/10 | 0 |
| 96/10 | 0.012 |
| 124/10 | 0.023 |
| 180/10 | 0.042 |

Figure 4:
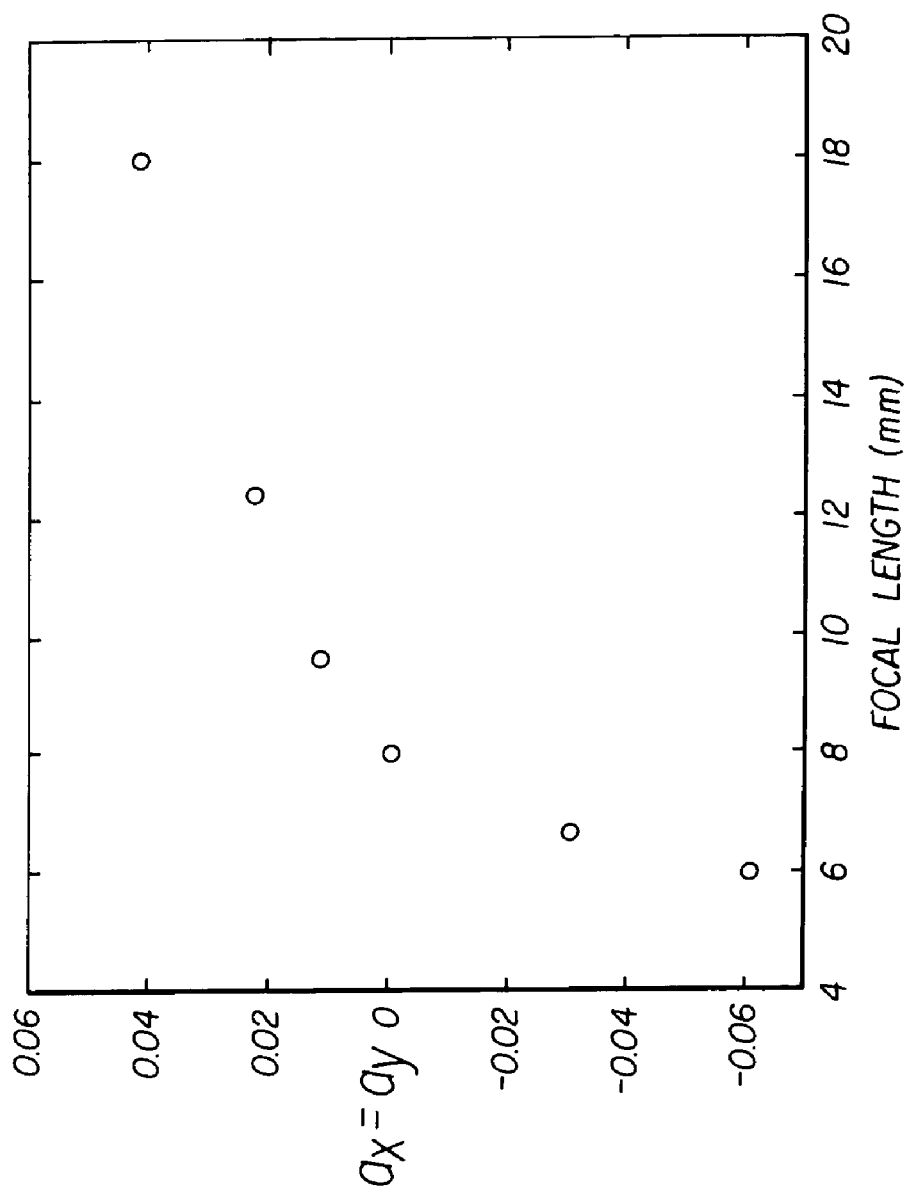
FIG. 4 is a plot of capture metadata and an associated correction parameter.
Figure 5:
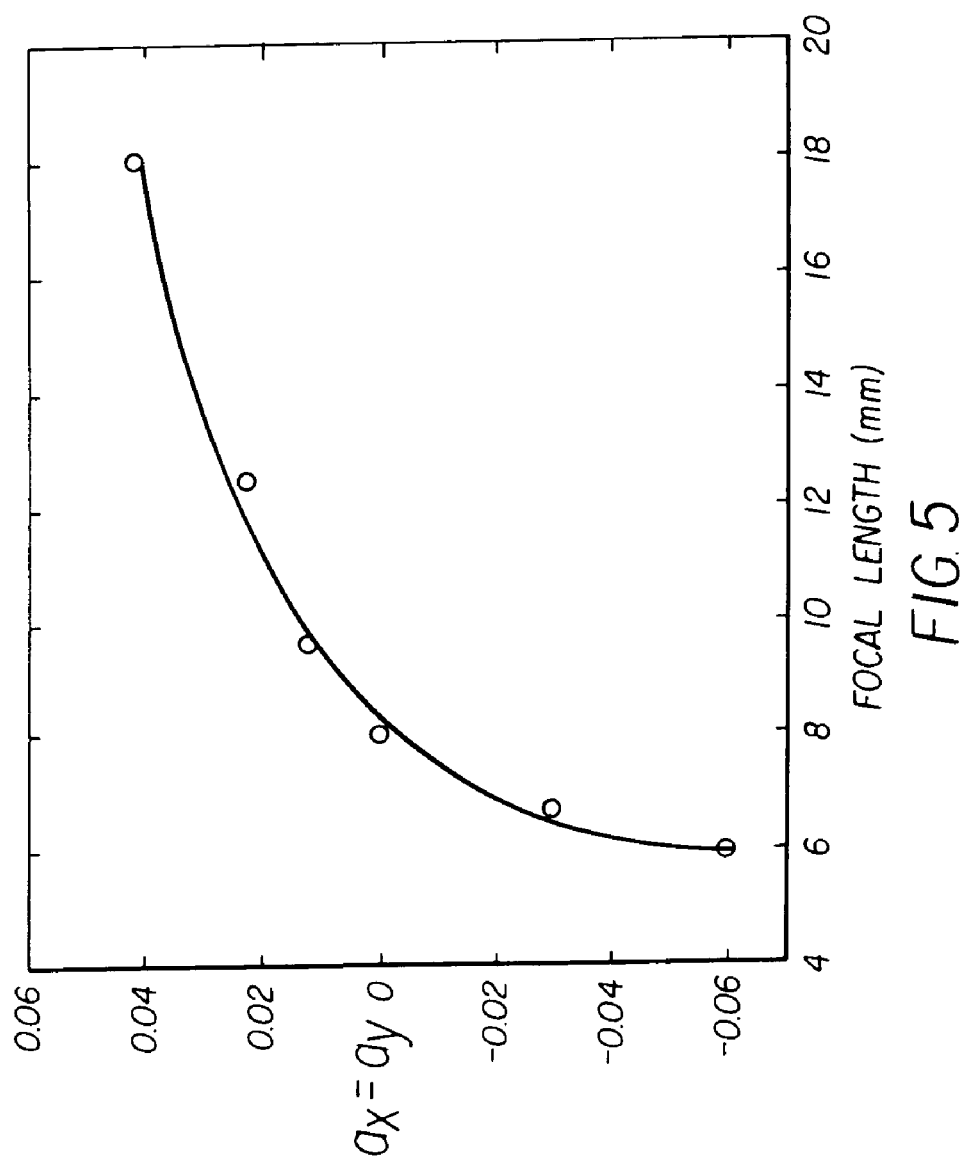
FIG. 5 is a plot of capture metadata and an associated correction parameter shown in FIG. 4, along with a functional fit of the same.

The second aspect of the update correction database step 34 is based on the observation that the optimal correction parameters 18 for a given capture degradation tend to vary slowly with respect to small changes in the capture metadata 14. For example, FIG. 4 shows a plot of pairs of correction parameters $a_x$ and capture metadata 14 (focal length for the Fuji FinePix 1400 Zoom Digital Camera.) Thus, the second aspect of the update correction database is to determine a functional fit between the correction parameters 18 and the capture metadata 14 of FIG. 3. Once the functional fit is determined for a particular camera, the correction parameters 18 can be determined by the parameter determiner 16 without using the analysis step 32, thereby saving time. Fitting a function to data is well known by those skilled in the art. Further detail about such fitting techniques can be obtained from numerous references known to those of skill in the art, such as *Practical Methods of Optimization, $2^{nd}$ edition*, by R. Fletcher, John Wiley & Sons, Ltd.: 1987. For the example shown in FIG. 4, a good functional fit is achieved by:

$$a_x = -0.000528(10f-60) + 0.0151\sqrt{10f-60} - 0.0611$$

as shown in FIG. 5.

This functional fit is added to the database 26 and associated with the capture metadata 14 of the camera model (i.e. Fuji FinePix 1400 Zoom Digital Camera, Focal Length: 60/10 to 180/10). Suppose that a digital image having associated capture metadata of: Fuji FinePix 1400 Zoom Digital Camera, Focal Length: 150/10 is input to the present embodiment of the invention. The functional fit equation (EQ. 3) is then retrieved from the database 26 by the parameter determiner 16 and evaluated, yielding a correction parameter $a_x=0.035$. Preferably, the functional fit is determined for a specific camera when correction parameters 18 are known for at least 4 different capture metadata 14.

The parameter determiner 16 may have the choice of either finding the correction parameters 18 with a lookup from the correction database 26, or calculating the correction parameter from a functional fit from the correction database 26. Preferably, the parameter determiner 16 uses the functional fit to determine the correction parameters 18.

In an alternate embodiment illustrated in FIG. 6, a confidence value is associated with each correction parameter and capture metadata pair in the correction database 26. In addition, a confidence value is associated with each functional fit and associated capture metadata 14 in the correction database. The confidence value is output from the analysis step 32 or from the optimization routine used to perform the functional fit in the update correction database step 34. The confidence value may be the negative of residual distortion error from an automatic algorithm, or the number of images that were used to determine the correction parameter. For example, the correction database 26 may contain the following information:

Database Table (with confidence values)
Fuji FinePix 1400 Zoom Digital Camera

| Focal Length (mm): | Correction Parameter $a_x = a_y$ | Confidence |
|---|---|---|
| 60/10 | −0.06 | −13.1 |
| 67/10 | −0.03 | −32.4 |
| 80/10 | 0 | −20.0 |
| 96/10 | 0.012 | −5.4 |
| 120/10 | 0.023 | −1.8 |
| 180/10 | 0.042 | −3.3 |

Where greater confidence values indicate higher confidence that the correction parameter(s) is reliable. In this embodiment, the parameter determiner 16 may use a threshold value $T_1$ (or some other criteria) on the confidence value to decide whether to use the correction parameters 18 associated with the capture metadata 14, or to perform the analysis step 32. Even if correction parameters 18 associated with the capture metadata 14 are present in the correction database 26, if the associated confidence value does not exceed the threshold value $T_1$ then the analysis step 32 is used to determine the correction parameters 18. A resolution step 36 then resolves the difference between the correction parameters determined from the analysis step 32 and the correction parameters found with the parameter lookup step 28. Such resolution is accomplished with an averaging, for instance with a weighted average based on the associated confidence values of the correction parameters from the parameter lookup step 28 and the analysis step 32. Weighted averages are well known in the art. The result of the resolution step is a set of resolved correction parameters 18. The update database step 34 then involves updating the correction parameters 18 already in the correction database 26. Likewise, a new functional fit can be calculated, according to the newly 10 determined correction parameters and the associated capture metadata 14. The functional fit process can also use the confidence values in the optimization procedure, forcing the functional fit to more closely match data points (correction parameters 18 and associated capture metadata 14) having higher confidence values. In addition, the confidence value is updated. This embodiment allows for the correction parameters 18 to improve over time by combining correction parameters 18 from many analysis step 32 results. While this embodiment has been described with greater confidence values indicating a higher confidence, those skilled in the art will recognize that lower confidence values could be used to indicate higher confidences as long as the criteria is adjusted accordingly.

In another example, the image processing algorithm 22 of FIG. 2 can correct for light falloff. Light falloff is exhibited by the fact that lenses produce non-uniform exposure at the focal plane when imaging a uniformly illuminated surface. When modeled as a thin lens, the ratio of the intensity of the light of the image at any point is described as $\cos^4$ of the angle between the optical axis, the lens, and the point in the image plane. Photographically, this light falloff generally causes the corners of an image to be darker than desired. In some situations, such as when photographing with a one-time-use camera, the exposure at the corner of the image may be less than half the exposure at the center of the image when photographing a uniformly illuminated surface.

Using an image processing algorithm to remove the light falloff from a digital image is known in the art of image processing and is described in U.S. Pat. No. 5,461,440. The correction is dependent on the relationship between the values of the pixels of the digital image and the exposure of the original scene. Assuming that the pixel values are linearly related to scene exposures, the correction for light falloff can be accomplished by multiplying each pixel value by a factor. If it is assumed that the $\cos^4$ thin lens light falloff is to be corrected, then the factor is related to the $\cos^4$ of the angle between the optical axis, the lens, and the point in the image plane, as shown in the following equation:

$$o(x, y) = i(x, y)\left[\cos^{-4}\left(\tan^{-1}\left(\frac{d}{f}\right)\right)\right]$$

where:
i(x,y) is the original digital image 12,
o(x,y) is the enhanced digital image 24 output from the image processing algorithm 22.
d is the distance between the $(xy)^{th}$ pixel position to the center of the image, measured in pixels.
f is the correction parameter 18 which is related to focal length in the thin lens model of light falloff, measured in pixels.

Preferably, the pixel values of the digital image are proportional to the logarithm of the scene exposures. As a result the image processing algorithm accomplishes the correction for light falloff by adding a constant to each pixel value of the digital image. Then, the following equation describes the image processing algorithm for the preferred case where the pixel values are proportional with the logarithm of scene exposure:

$$o(x, y) = i(x, y) + 4cvs\log\left[\cos\left(\tan^{-1}\left(\frac{d}{f}\right)\right)\right]$$

where cvs is the number of code values per stop (doubling) of exposure. Preferably, cvs=188. All other variables have previously been defined. Note that the model focal length may actually differ from the actual focal length of the camera used to capture the digital image because the model focal length is that value of f that best accounts for the light falloff in the digital image, using the $\cos^4$ falloff model from the thin lens assumption. Thus, the model focal length may vary from the camera focal length because real lenses deviate from the thin lens, and various factors, such as vignetting are not considered in the $\cos^4$ falloff model. In addition, the model focal length f is defined in units of pixels, while capture metadata 14 information typically records the focal length in units of millimeters. Converting between pixels and millimeters is difficult unless the physical size (in millimeters, for example) and the resolution (in pixels) of the image sensor is known. Thus, the correction database 26 relates the focal length of the camera (which is capture metadata 14) to the optimal correction parameter f.

As before, the correction database 26 stores capture metadata and associated correction parameters 18. As shown in FIG. 3, if the parameter lookup step 28 determines that the correction database 26 does not contain correction parameters for the capture metadata of any particular digital image, then the analysis step 32 determines the correction parameters 18. An automatic method of determining the correcting parameters 18 to correct for light falloff is described in commonly-assigned copending application Ser. No. 09/626,882, entitled "A Method of and System for Automatically Determining a Level of Light Falloff in an Image" and filed 27 Jul. 2000 in the name of Andrew C. Gallagher, which is assigned to the assignee of this application and incorporated herein by reference.

As has been described herein, the parameter determiner 16 finds correction parameters 18 that can be used by an image processing algorithm 22 to reduce and/or correct for an image capture degradation, such as lens falloff, lens distortion, and lateral color aberration, or defocus. In addition, image correction parameters can be used by an appropriate image processing algorithm to reduce and/or correct for image sharpness, contrast and color, so long as the corrections are constant for all images having common image capture metadata (e.g., for each camera) and the correction parameters can be determined by an automatic algorithm.

The invention has been described in detail with particular reference to certain preferred embodiments thereof, but it will be understood that variations and modifications can be effected within the spirit and scope of the invention.

PARTS LIST 10 image capture device
12 original digital image
14 capture metadata
16 parameter determiner
18 correction parameters
20 digital image processor
22 image processing algorithm
24 enhanced image
26 correction database
28 parameter lookup step
30 image output device
32 analysis step
34 update correction database step
36 resolution step
40 general control computer
41 display device
42 input control device
50 display device
60 input control device
70 offline memory device

What is claimed is:

1. A method of processing an image to reduce image degradation due to image capture problems, comprising the steps of:
   (a) providing image data corresponding to a captured image and image capture metadata that refers specifically to information that is associated with capture of the image;
   (b) providing a database of correction parameters that can be used to reduce degradation present in the captured image, whereby each correction parameter is associated with particular image capture metadata;
   (c) using the image capture metadata to determine whether the database contains one or more correction parameters associated with the image capture metadata;
   (d) producing correction parameters from the database of correction parameters when the database contains correction parameters associated with the image capture metadata; and
   (e) producing one or more new correction parameters from an algorithm when the database does not contain correction parameters associated with the image capture metadata.

2. The method as claimed in claim 1 wherein the database is updated with the new correction parameters produced by step (e), thereby producing one or more updated correction parameters in the database.

3. The method as claimed in claim 2 wherein updated correction parameters are produced in step (d) when image capture metadata is subsequently provided in step (a) that specifically refers to the image capture metadata that was previously used in step (e) to produce the updated correction parameters.

4. The method as claimed in claim 1 wherein step (d) produces correction parameters when there is a predetermined near match between the image capture metadata and the correction parameters associated with particular image capture metadata in the database.

5. The method as claimed in claim 1 further comprising the steps of:
   (f) providing the correction parameter(s) produced in either step (d) or step (e) to an image processing algorithm; and
   (g) using the image processing algorithm with the provided correction parameter(s) to reduce the image degradation.

6. The method as claimed in claim 5 wherein the capture problem is a lens degradation, the image capture metadata is indicative of the degradation, and the algorithm corrects for the degradation.

7. The method as claimed in claim 5 wherein the capture problem is a light falloff, the image capture metadata is indicative of the light falloff, and the algorithm corrects for the light falloff.

8. The method as claimed in claim 5 wherein the capture problem is a lens distortion, the image capture metadata is indicative of the lens distortion, and the algorithm corrects for the lens distortion.

9. The method as claimed in claim 1 wherein image data for one or more additional images are provided in step (a) and wherein the algorithm used in step (e) additionally processes one or more of the additional images in order to produce the correction parameter for the image.

10. A computer storage medium having instructions stored therein for causing a computer to perform the method of claim 1.

11. A method of processing an image to reduce image degradation due to image capture problems, comprising the steps of:
    (a) providing image data corresponding to a captured image and image capture metadata that refers specifically to information that is associated with capture of the image;
    (b) providing a database of correction parameters that can be used to reduce degradation present in the captured image, whereby each correction parameter is associated with particular image capture metadata;
    (c) using the image capture metadata to determine whether the database contains one or more correction parameters associated with the image capture metadata;
    (d) producing correction parameters from the database of correction parameters when the database contains correction parameters associated with the image capture metadata; and
    (e) using the correction parameters from the database to produce a functional fit between the correction parameters in the database and the particular image capture metadata associated with the correction parameters, and then using the functional fit to provide one or more new correction parameters when the database does not contain correction parameters associated with the image capture metadata.

12. The method as claimed in claim 11 wherein the database is updated with the new correction parameters provided by step (e), thereby producing one or more updated correction parameters in the database.

13. The method as claimed in claim 11 wherein the database is updated with the functional fit produced by step (e), thereby enabling the production of one or more new correction parameters without having to recalculate the functional fit.

14. A computer storage medium having instructions stored therein for causing a computer to perform the method of claim 11.

15. A method of processing an image to reduce image degradation due to image capture problems, comprising the steps of:
   (a) providing image data corresponding to a captured image and image capture metadata that refers specifically to information that is associated with capture of the image;
   (b) providing a database of correction parameters that can be used to reduce degradation present in the captured image, whereby each correction parameter is associated with particular image capture metadata and with a confidence value;
   (c) using the image capture metadata to determine whether the database contains one or more correction parameters associated with the image capture metadata;
   (d) producing one or more correction parameters from the database of correction parameters when the database contains one or more correction parameters associated with the image capture metadata and the confidence value meets a criteria; and
   (e) producing one or more improved correction parameters when the database does not contain correction parameters associated with the image capture metadata or if the confidence value does not meet the criteria.

16. The method as claimed in claim 15, when step (e) produces one or more improved correction parameters because the correction parameters in the database did not meet the criteria for the confidence value, said method further comprising the steps of:
   (f) resolving the difference between the improved correction parameters and the correction parameters in the database, thereby providing one or more resolved correction parameters that are used to update the database, and
   (g) updating the confidence value associated with the resolved correction parameters.

17. The method as claimed in claim 16 wherein the step (f) of resolving the difference comprises averaging the improved correction parameters and the parameters in the database.

18. The method as claimed in claim 15 wherein image data for one or more additional images are provided in step (a) and wherein the algorithm used in step (e) processes one or more of the additional images in order to produce one or more improved correction parameters, said method further comprising the steps of:
   (f) recalculating the confidence level for the improved correction parameters; and
   (g) updating the database with the improved correction parameters and the recalculated confidence level.

19. The method as claimed in claim 18 further comprising the steps of providing one or more additional images and applying a threshold to the recalculated confidence level in order to decide whether to use the improved correction parameters to correct the additional images.

20. A computer storage medium having instructions stored therein for causing a computer to perform the method of claim 15.

* * * * *